US007802423B2

(12) United States Patent
Frydman et al.

(10) Patent No.: US 7,802,423 B2
(45) Date of Patent: Sep. 28, 2010

(54) CONDENSER UNIT FOR $NO_x$ EMISSION REDUCTION SYSTEM (75) Inventors: Arnaldo Frydman, Houston, TX (US); Ke Liu, Rancho Santa Margarita, CA (US); Gregg Anthony Deluga, Playa Del Rey, CA (US); David Eric Ladd, Murrieta, CA (US)

(73) Assignee: General Electric Company, Niskayuna, NY (US)

( * ) Notice: Subject to any disclaimer, the term of this patent is extended or adjusted under 35 U.S.C. 154(b) by 1073 days.

(21) Appl. No.: 11/507,219

(22) Filed: Aug. 21, 2006

(65) Prior Publication Data
US 2008/0047259 A1 Feb. 28, 2008

(51) Int. Cl.
*F01N 3/10* (2006.01)
(52) U.S. Cl. .............................. 60/302; 60/274; 60/286; 60/303; 60/317; 422/177; 422/180
(58) Field of Classification Search ............. 60/286, 60/274, 301, 303, 294, 302, 317; 422/177, 422/180; 202/152, 185.1, 185.2, 202
See application file for complete search history.

(56) References Cited
U.S. PATENT DOCUMENTS

| | | | | |
|---|---|---|---|---|
| 3,840,070 | A * | 10/1974 | Becker et al. | 165/167 |
| 4,666,480 | A * | 5/1987 | Mann | 62/616 |
| 5,189,876 | A | 3/1993 | Hirota et al. | |
| 5,875,637 | A * | 3/1999 | Paetow | 62/117 |
| 6,363,716 | B1 | 4/2002 | Balko et al. | |
| 6,739,125 | B1 * | 5/2004 | Mulligan | 60/286 |
| 7,080,512 | B2 * | 7/2006 | Schoell | 60/670 |
| 7,257,845 | B1 * | 8/2007 | Conner, IV | 2/209.12 |
| 7,257,945 | B2 * | 8/2007 | Kass et al. | 60/286 |
| 7,413,634 | B1 * | 8/2008 | Napier | 202/153 |

(Continued)

FOREIGN PATENT DOCUMENTS

DE    870243 C    3/1953

(Continued)

OTHER PUBLICATIONS

PCT International Search Report dated Jan. 29, 2008.

(Continued)

*Primary Examiner*—N. Bhat
(74) *Attorney, Agent, or Firm*—Marie-Claire Maple (57) ABSTRACT

A system and method for the reduction of $NO_x$ emissions from combustion sources are provided. The system includes a fuel tank, fuel converter unit, condensor unit, selective catalytic reduction (SCR) unit and an engine. The condenser unit includes a generally cylindrical inner wall defining a cavity having a first lower end and a second upper end, the first lower end is configured to include a gas inlet for receiving a gas mixture from the fuel converter and the second upper end is configured to include a gas outlet in fluid communication with the SCR unit. A heat exchanger is disposed within the cavity of the condensor unit to contact the gas mixture and separate heavy hydrocarbons from light hydrocarbons, wherein the light hydrocarbons are fed to the SCR unit and the heavy hydrocarbons are condensed and either send back to the fuel tank or directly to the engine for combustion.

27 Claims, 3 Drawing Sheets

U.S. PATENT DOCUMENTS

2002/0038760 A1    4/2002    Salmisuo

FOREIGN PATENT DOCUMENTS

| EP | 0157564 A2 | 10/1985 |
| --- | --- | --- |
| GB | 703476 A | 2/1954 |
| GB | 2118448 A | 11/1983 |
| GB | 2295561 * | 5/1996 |
| GB | 2295561 A | 6/1996 |
| WO | WO2005003546 A1 | 1/2005 |
| WO | WO2007005308 A2 | 1/2007 |

OTHER PUBLICATIONS

U.S. Appl. No. 11/172,288, entitled "Conversion System for Reducing NOx Emissions", filed Jun. 30, 2005.

U.S. Appl. No. 11/172,642, entitled "Method and System for Regeneration of a Catalyst", filed Jun. 30, 2005.

* cited by examiner

CONDENSER UNIT FOR $NO_x$ EMISSION REDUCTION SYSTEM

BACKGROUND OF THE DISCLOSURE

This disclosure relates generally to a system and method for reducing $NO_x$ emissions in locomotives and vehicles that employ hydrocarbon-based fossil fuels, and more particularly, to a condenser unit for a $NO_x$ emission reduction system.

Production of emissions from mobile and stationary combustion sources such as locomotives, vehicles, power plants, and the like, has resulted in environmental pollution. One particular source of such emissions is $NO_x$ emissions from vehicles. Environmental legislation restricts the amount of $NO_x$ that can be emitted by vehicles. In order to comply with this legislation, efforts have been directed at reducing the amount of $NO_x$ emissions.

One method of emission reduction is directed to minimizing the amount of NOx emissions produced during the process of combustion in engines. This method generally involves redesigning engines to optimize the combustion of fuel. This approach has resulted in the reduction of $NO_x$ over the years; however, it is expensive and all efforts so far have not resulted in any substantial reduction in $NO_x$ emissions.

Another method is directed to using an ammonia selective catalytic reactor (SCR) to reduce $NO_x$ emissions. In this method, a solution of ammonia or urea contacts the exhaust stream of the combustion source to reduce the $NO_x$ to nitrogen over a SCR catalyst, water and carbon dioxide (if urea is used). This method is disadvantageous in that toxic chemicals such as ammonia or urea have to be carried on vehicles and maintained at sufficient levels for $NO_x$ reduction.

Yet another method is the "lean $NO_x$ trap" method that involves the dispersion of metal catalysts onto substrates such as, for example, barium oxide (BaO), calcium oxide (CaO) or barium carbonate ($BaCO_3$) to form $NO_x$ traps which are placed in the exhaust stream of a vehicle engine. When, for instance, BaO is saturated with $NO_x$ thus forming barium nitrate, $Ba(NO_3)_2$, reductants are used to reduce the $Ba(NO_3)_2$ back to BaO and nitrogen. $NO_x$ emissions into the atmosphere are then reduced in this way. The cycle is then repeated. This method requires a large $NO_x$ trap often in a dual bed arrangement. For application on a locomotive or other mobile combustion sources, this method of reducing $NO_x$ would be too expensive and would take considerable space.

Furthermore, $NO_x$ SCR systems employing diesel fuel directly as the $NO_x$ reductant have been demonstrated in the past. However, straight injection of diesel fuel has shown to be inefficient because it causes coking on the SCR catalyst. In addition, when the exhaust temperature is low, injecting diesel fuel directly to the exhaust stream cannot reduce the $NO_x$. Also, there has been application of lighter hydrocarbons, such as propane, as $NO_x$ reductants to the SCR system, but those concepts do not present feasibility for vehicular on-board systems.

It is therefore desirable to have a fuel conversion system that does not require carrying toxic chemicals, and avoids the development of expensive infrastructure for reductant distribution. Furthermore, a need exists for techniques for generating $NO_x$ reductants while increasing fuel efficiency of the fuel conversion system.

BRIEF DESCRIPTION OF THE DISCLOSURE

A system and method for generating a mixture of hydrocarbons in the $C_2$-$C_{12}$ range, plus $H_2$ and CO, as $NO_x$ reductants to be injected in an engine exhaust stream are provided. A condensor unit with a built-in heat exchanger is also provided to condense the $C_{13}$+ hydrocarbons provided by a fuel or diesel converter. The condensor unit of the present disclosure works at different hot vapor compositions & flow rates and allows the desired hydrocarbon stream, e.g., $C_{12}$ or less, to be injected into the engine exhaust stream and non-desired heavy hydrocarbons, e.g., in the $C_{13}$ or greater range, to be condensed and sent to a fuel tank of the fuel system.

According to an aspect of the present disclosure, a condenser unit is provided. The condensor unit includes a generally cylindrical inner wall defining a cavity having a first lower end and a second upper end, where the first lower end is configured to include a gas inlet and the second upper end is configured to include a gas outlet. A heat exchanger is disposed within the cavity along the cylindrical wall dividing the cavity into a lower cavity and an upper cavity, wherein the heat exchanger is configured to contact a gas entering the gas inlet and separate heavy hydrocarbons from light hydrocarbons. The light hydrocarbons flow out of the condenser unit through the gas outlet and the heavy hydrocarbons condense and collect in the lower cavity.

According to another aspect of the present disclosure, a system for reducing NOx emissions includes a fuel tank in fluid communication with a fuel converter, wherein the fuel converter is located down stream of the fuel tank and wherein the fuel converter comprises a catalyst composition that is operative to continuously convert heavy hydrocarbons, such as diesel fuel which is typically comprised by hydrocarbons having 13 or more carbon atoms per molecule, into light hydrocarbons having 12 or less carbon atoms per molecule; a condenser unit located downstream of the fuel converter and upstream of a selective catalytic reduction unit, the selective catalytic reduction unit in fluid communication with the condenser unit and located downstream of the condensor unit; and an engine in fluid communication with the fuel tank and the selective catalytic reduction unit, wherein the engine is located downstream of the fuel tank and upstream of the selective catalytic reduction unit; wherein the condensor unit comprises a generally cylindrical inner wall defining a cavity having a first lower end and a second upper end, the first lower end is configured to include a gas inlet for receiving a gas mixture from the fuel converter and the second upper end is configured to include a gas outlet in fluid communication with the selective catalytic reduction unit, a heat exchanger disposed within the cavity along the cylindrical wall dividing the cavity into a lower cavity and an upper cavity, wherein the heat exchanger is configured to contact the gas mixture entering the gas inlet and separate heavy hydrocarbons, from condensation driven by dew point, from light hydrocarbons, wherein the light hydrocarbons are fed to the selective catalytic reduction unit and the heavy hydrocarbons are condensed and collected in the lower cavity.

In a further aspect of the present disclosure, a method for reducing $NO_x$ emissions is provided. The method includes converting in the presence of a catalyst composition, heavy hydrocarbons, such as diesel fuel which is typically comprised by hydrocarbons having 13 or more carbon atoms per molecule, into a light hydrocarbons having 12 or less carbon atoms per molecule; wherein the catalyst composition comprises sites that perform a cracking function and sites that perform a catalytic partial oxidation function, wherein the cracking function enables the conversion of the heavy hydrocarbon molecules to light hydrocarbon molecules, and wherein the catalytic partial oxidation function enables oxidation of a hydrocarbon-based fossil fuel and coke that is deposited on the catalyst composition; separating the light hydrocarbon molecules from heavy hydrocarbon molecules by condensing the heavy hydrocarbons into a liquid; reacting the light hydrocarbon molecules with an exhaust stream of an engine in the presence of a selective catalytic reduction catalyst; and reducing $NO_x$ content in the exhaust stream.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Preferred embodiments of the present disclosure will be described hereinbelow with reference to the accompanying drawings. In the following description, well-known functions or constructions are not described in detail to avoid obscuring the disclosure in unnecessary detail.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

In diesel engine exhaust treatment systems, a mixture of hydrocarbons in the $C_2$-$C_{12}$ range is desired as a $NO_x$ reductant to be injected in the engine exhaust stream prior to the SCR (selective catalytic reduction) catalyst unit. In these exhaust treatment systems, the engine's diesel fuel (a hydrocarbon mixture generally including $C_{10}$ up to $C_{24}$ compounds) is catalytically cracked by an autothermal catalytic (ATC) cracking process and converted into a mixture of $H_2$, CO, $CO_2$, and a plurality of hydrocarbon species ranging from $CH_4$ to diesel range. The preferred hydrocarbons for the $NO_x$ SCR process are within the $C_2$-$C_{12}$ range. Since the product mixture is comprised of that range and of higher hydrocarbons, likely up to $C_{24}$, a separation procedure is required. Furthermore, the separation process is performed because the hydrocarbons above the $C_2$-$C_{12}$ range, and particularly above $C_{12}$, are known to cause coking on the SCR catalyst and are not efficient $NO_x$ reductants as well. In addition, the typical yield of the ATC cracking process is less than 45% in the desired product range, thus a large amount of undesirable and unconverted feed is encountered in the outlet stream of the fuel converter unit, which will cause a large fuel penalty because $C_{13+}$ hydrocarbons are sent to the SCR catalyst together with the lighter hydrocarbons.

Disclosed herein is a system for the continuous reduction of $NO_x$ emissions in locomotives, stationary generators, and vehicles. The system advantageously utilizes hydrocarbons in a range of $C_2$-$C_{12}$ plus $H_2$ and CO obtained from a diesel converter unit (DCU) and condenser unit to reduce $NO_x$ emissions. The diesel converter unit (DCU) converts fuel, for instance diesel fuel, into a gas mixture including a plurality of hydrocarbon species ranging from $CH_4$ to diesel range, and the condensor unit condenses the heavy hydrocarbons, e.g., in the $CH_{13}+$ range, and emits light hydrocarbons in the $CH_2$-$CH_{12}$ range. These light hydrocarbons are mixed with the exhaust stream of the engine and facilitate a reduction of $NO_x$ emissions in the presence of a hydrocarbon-based selective catalytic reduction (SCR) catalyst bed. The light hydrocarbons plus the CO and $H_2$ exiting the condenser unit will react with the $NO_x$ in the exhaust stream and reduce $NO_x$ to nitrogen at the surface of a selective catalytic reduction (SCR) unit, thereby reducing $NO_x$ emissions from the vehicle. The system can be advantageously utilized on-board in all types of vehicles that employ internal combustion engines powered by hydrocarbon-based fossil fuels or isolated units that have no access to other reductants. The system can also be advantageously utilized on-board in all types of locomotives that employ engines and turbines powered by hydrocarbon-based fossil fuels. In one embodiment, the hydrocarbon-based fossil fuels are liquids. In particular, the system can be advantageously utilized in vehicles that employ diesel engines such as passenger vehicles, buses, ships, off-road vehicles, etc. Locomotives that employ diesel engines and diesel turbines can advantageously use the system on-board for reduction of $NO_x$ emissions. The system can be also utilized in stationary combustion sources burning hydrocarbon-based fuels such as generators, boilers or the like.

Figure 1:
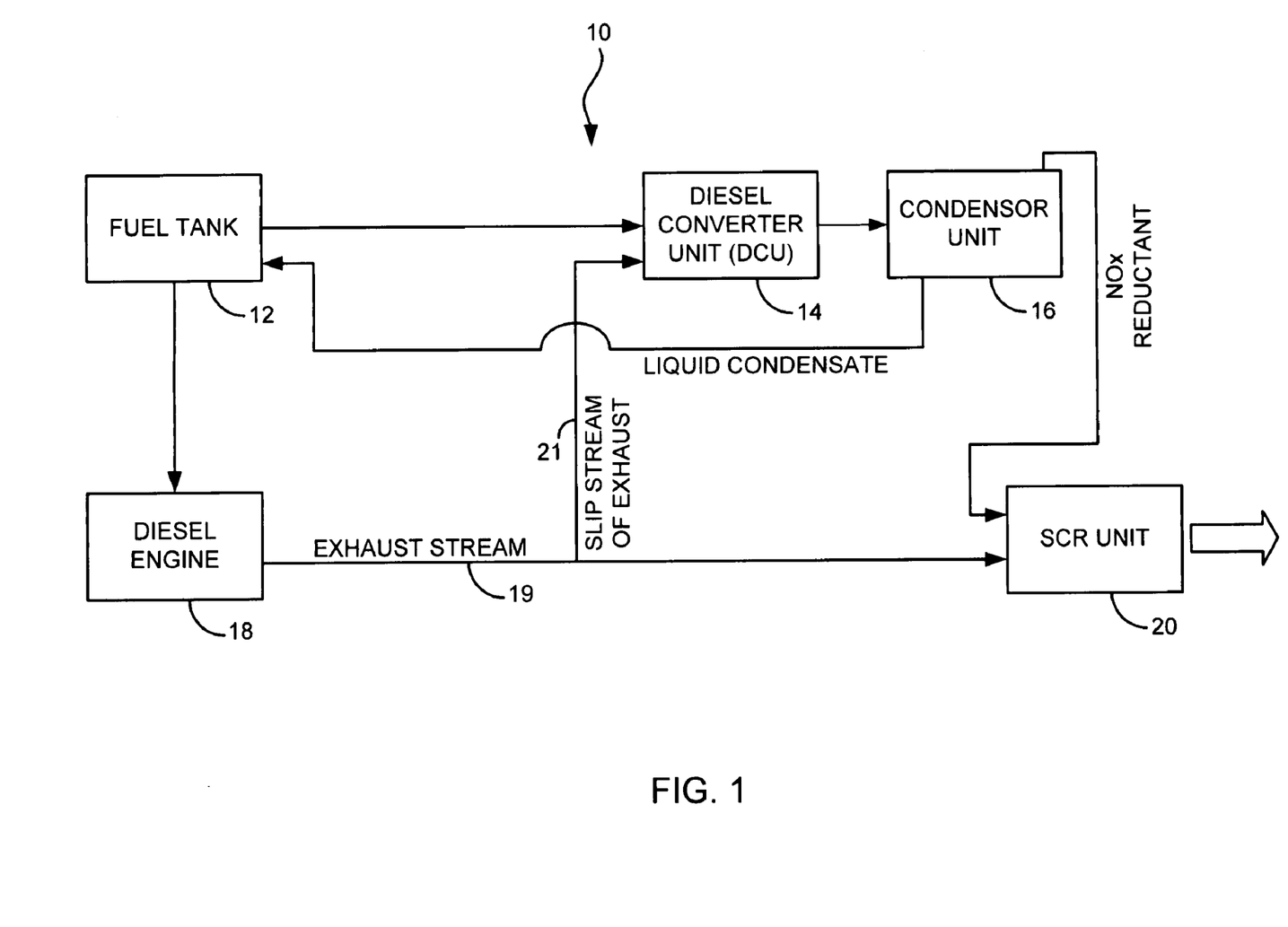
FIG. 1 illustrates an exemplary system for reducing $NO_x$ emissions in accordance with the present disclosure.

With reference now to FIG. 1, an example of system 10 for the reduction of $NO_x$ emissions comprises a fuel tank 12, a diesel converter unit 14, a condenser unit 16, a SCR unit 20 and an engine 18. The fuel tank 12 is upstream of the diesel converter unit 14, the condenser unit 16 and the SCR unit 20. The fuel tank 12, the diesel converter unit 14, the condensor unit 16 and the SCR unit 20 are in fluid communication with one another. The condenser unit 16 is located between the diesel converter unit 14 and the SCR unit 20 and is upstream of the SCR unit 20. The condensor unit 16 is in fluid communication with the fuel tank 12, the diesel converter unit 14 and the SCR unit 20. The engine 18 is located downstream of the fuel tank 12 and in fluid communication with the fuel tank 12. The engine 18 is located upstream of the diesel converter unit 14 and the SCR unit 20 and is in fluid communication with both the diesel converter unit 14 and the SCR unit 20. In operation, the engine 18 is supplied with fuel from fuel tank 12 and produces exhaust gases. These gases are recovered using a manifold (not shown) at the outlet of the engine 18 and are discharged as exhaust stream 19.

The term "fluid communication" encompasses the containment and/or transfer of compressible and/or incompressible fluids between two or more points in the system 10. Examples of suitable fluids are gases, liquids, combinations of gases and liquids, or the like. The use of pressure transducers, thermocouples, flow sensors, hydrocarbon sensors and $NO_x$ sensors aid in communication and control. In one embodiment, computers and/or microprocessors can be used to aid in the flow of fluids in the system. The term "on-board" refers to the ability of a vehicle or locomotive to host the system 10 in its entirety aboard the vehicle or locomotive.

A variety of fuels may be stored in the fuel tank 12 and used in the system 10. In one embodiment, the fuel is a hydrocarbon-based fossil fuel. It is desirable for the hydrocarbon-based fossil fuel to be a liquid. Examples of suitable liquids are diesel, gasoline, jet-fuel, logistic fuel (JP-8), kerosene, fuel oil, bio-diesel, or the like, or a combination comprising at least one of the foregoing hydrocarbon-based fossil fuels. As will be discussed in further detail below, the fuel converter 14 converts heavy hydrocarbons to light hydrocarbons which are then used to reduce $NO_x$ in the exhaust. Heavy hydrocarbons are hydrocarbons that have 13 or more carbon atoms. In an exemplary embodiment, an exemplary heavy hydrocarbon is diesel. Light hydrocarbons are those that have 12 or less carbon atoms. Exemplary light hydrocarbons are those having about 2 to about 9 hydrocarbons. Light hydrocarbons are also termed paraffinic hydrocarbons. Paraffinic hydrocarbons can be saturated or unsaturated.

The fuel converter 14 comprises a fixed bed reactor that comprises a catalyst composition. It is desirable for the catalyst composition to be able to operate under conditions that vary from oxidizing at the inlet of the reactor to reducing conditions at the exit of the reactor. The catalyst should be capable of operating effectively and without any thermal degradation from a temperature of about 200 to about 900° C. The catalyst should operate effectively in the presence of air, carbon monoxide, carbon dioxide, water, alkanes, alkenes, cyclic and linear compounds, aromatic hydrocarbons and sulfur-containing compounds. The catalyst composition should provide for low levels of coking such as by preferentially catalyzing the reaction of carbon with water to form carbon monoxide and hydrogen thereby permitting the formation of only a low level of carbon on the surface of the catalyst. The catalyst composition should be able to resist poisoning from such common poisons such as sulfur and halogen compounds. Moreover, an exemplary catalyst composition may satisfy all of the foregoing requirements simultaneously.

The catalyst composition is bifunctional, i.e., it performs a cracking function and a catalytic partial oxidation function. The cracking function involves the breaking of hydrocarbon-based fossil fuel molecules (e.g., diesel) into shorter molecules to extract low-boiling fractions such as gasoline. An exemplary cracking function involves the breaking of heavy hydrocarbon molecules having thirteen or more carbon atoms to light hydrocarbon molecules having twelve or less carbon atoms.

The catalytic partial oxidation function involves the oxidation of coke or hydrocarbons into carbon monoxide and hydrogen. The catalyst composition generally comprises sites that perform the catalytic partial oxidation function (catalytic partial oxidation sites) located adjacent to sites that perform the cracking function (cracking sites).

In one embodiment, the catalyst composition contained in the fuel converter 14 is bifunctional, i.e., it serves to crack heavier hydrocarbons to light hydrocarbons, while simultaneously preventing poisoning of the catalyst composition from coke depositions. Coke build-up that occurs during the cracking of hydrocarbons while using traditional zeolite cracking catalysts during processes such as fluidized catalytic cracking (FCC) deactivates the catalyst. The bifunctional catalyst advantageously slows down coke build-up rate on the surface of cracking catalysts, thus allowing it to continue being active for cracking hydrocarbons, which would normally not occur on conventional cracking catalysts operating under similar conditions.

In the catalyst composition, since the catalytic partial oxidation reaction is an exothermic reaction, while cracking is an endothermic reaction, the heat generated at a catalytic partial oxidation site facilitates the endothermic cracking reaction and also facilitates the oxidation of coke. In one embodiment, the catalytic partial oxidation sites are used to oxidize the coke away from the cracking sites to keep the cracking sites clean and active.

The use of a fuel converter 14 that employs the catalytic composition is advantageous in that it may use only a single fixed bed reactor to convert diesel fuel to a mixture of light hydrocarbons and syngas. Syngas comprises hydrogen and carbon monoxide. This mixture of light hydrocarbons and syngas can be used as a reducing agent for $NO_x$ reduction in the diesel engine exhaust. If desired, the fuel converter 14 can employ more than one fixed bed reactor to improve productivity. For example, the catalytic converter can employ about 2 to about 6 fixed bed reactors if desired.

The catalytic partial oxidation sites generally comprise noble metals that perform the catalytic partial oxidation function. The catalytic partial oxidation sites comprise one or more "platinum group" metal components. As used herein, the term "platinum group" metal implies the use of platinum, palladium, rhodium, iridium, osmium, ruthenium or mixtures thereof. Exemplary platinum group metal components are rhodium, platinum and optionally, iridium. The catalyst composition generally comprises about 0.1 to about 20 wt % of the platinum group metal. The platinum group metal components may optionally be supplemented with one or more base metals, particularly base metals of Group VIII, Group IB, Group VB and Group VIB of the Periodic Table of Elements. Exemplary base metals are iron, cobalt, nickel, copper, vanadium and chromium.

The cracking sites generally comprise a zeolite. The zeolites generally have a silica-to-alumina mole ratio of at least about 12. In one embodiment, a zeolite having a silica-to-alumina mole ratio of about 12 to about 1000 is used. In one embodiment, a zeolite having a silica-to-alumina mole ratio of about 15 to about 500 is used. Examples of suitable zeolites are RE-Y (rare earth substituted yttria), USY (ultrastable yttria zeolite), RE-USY ZSM-5, ZSM-11, ZSM-12, ZSM-35, zeolite beta, MCM-22, MCM-36, MCM-41, MCM-48, or the like, or a combination comprising at least one of the foregoing zeolites.

Zeolites also contemplated for use in this process are the crystalline silicoaluminophosphates (SAPO). Examples of suitable silicoalumino-phosphates include SAPO-11, SAPO-34, SAPO-31, SAPO-5, SAPO-18, or the like, or a combination comprising at least one of the foregoing silicoaluminophosphates.

The platinum group catalysts along with other base metal catalysts are washcoated onto molecular sieves disposed in the fuel converter to form the catalytic composition. In one embodiment, the catalytic partial oxidation sites comprise about 0.1 to about 5.0 weight percent (wt %) of the total weight of the catalytic composition. In a preferred embodiment, the catalytic partial oxidation sites comprise about 0.3 to about 1.0 wt % of the total weight of the catalytic composition.

In an exemplary embodiment, in one method of operating the fuel converter 14, a gas-assisted nozzle is utilized to atomize the fuel at a low-pressure inlet into the fuel converter 14 (not shown). The fuel, which primarily comprises heavy hydrocarbons, undergoes cracking to form light hydrocarbons. The light hydrocarbons are then used to reduce the $NO_x$ emitted in the engine exhaust. The reduction of the $NO_x$ with the light hydrocarbons occurs in the presence of a SCR catalyst as will be described below.

A portion of the hot exhaust gas that is emitted by the locomotive engine, e.g., slip stream exhaust 21, can be used as a secondary gas for atomizing the fuel. Air can also be employed as the secondary gas for atomizing the fuel. In an exemplary embodiment, a portion of the exhaust stream is combined with air to form the secondary gas to facilitate the catalytic partial oxidation reaction. The amount of hot engine exhaust gas is effective to light off the catalytic partial oxidation reaction in the fuel converter 14. The heat released from the exothermic catalytic partial oxidation reaction will drive the endothermic cracking reaction forward. Water present in the exhaust stream can facilitate the reduction of coke formation on the catalyst.

The condensor unit 16 is located between the fuel converter 14 and the SCR unit 20, e.g., a SCR catalyst reactor. The condensor unit 16 is located down stream of the fuel converter 14 and upstream of the SCR catalyst reactor 20. The condenser unit 16 is in fluid communication with the fuel converter 14 and the SCR unit 20. A feed back loop between the condensor unit 16 and the fuel tank 12 serves to recycle heavy hydrocarbons to the fuel tank 12 or engine 18 as will be described below. The condensor unit 16 seeks to increase fuel efficiency and increase the robust nature of the SCR catalyst. Additionally, the condensor unit 16 introduces more robustness to the system 10 by producing a rich stream of useful reductants to the SCR unit 20.

Figure 2:
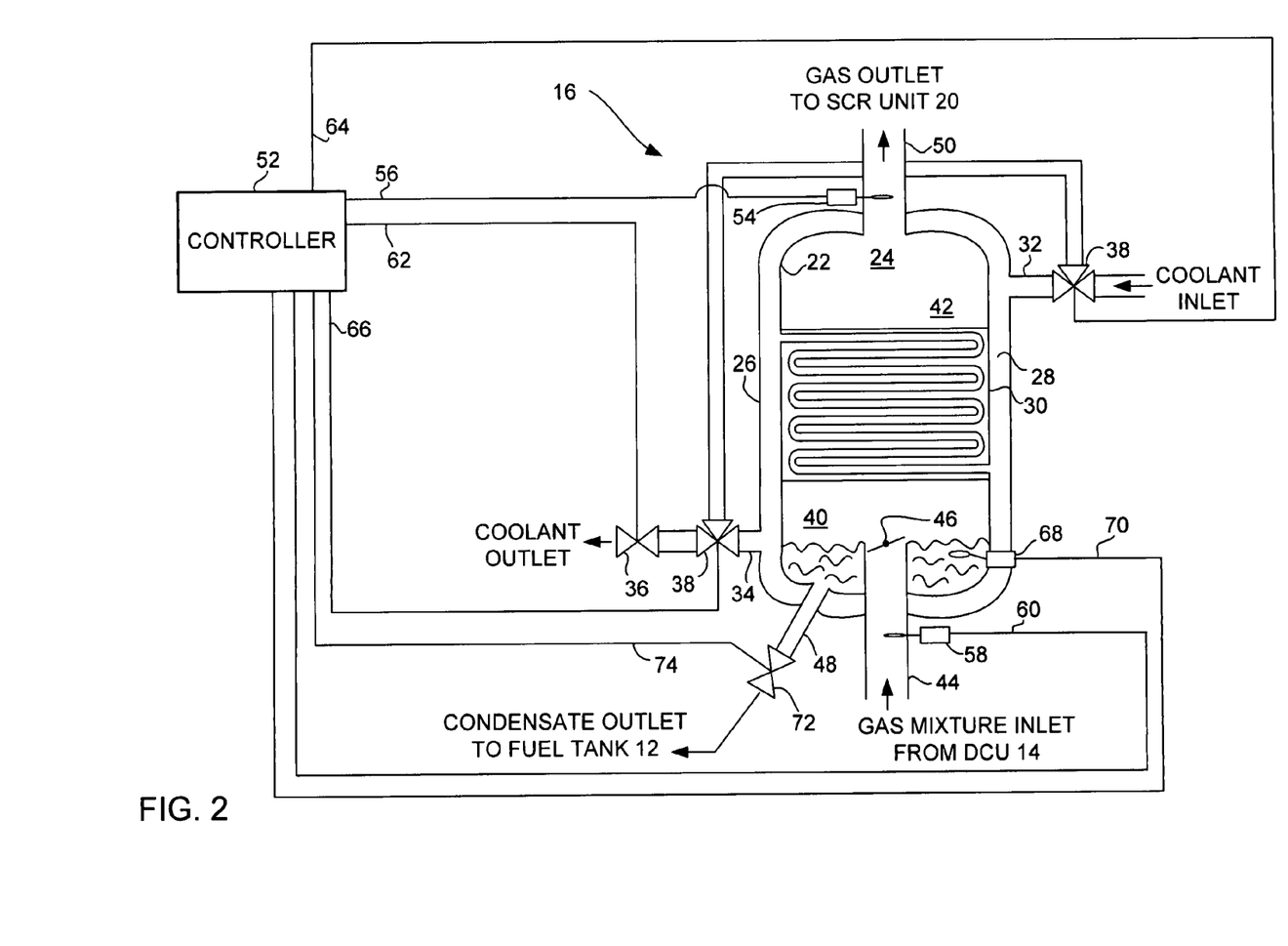
FIG. 2 is a schematic diagram of an exemplary embodiment of a condensor unit in accordance with the present disclosure.

Referring to FIG. 2, the condensor unit 16 is illustrated. The condenser unit 16 includes a generally cylindrical inner wall 22 defining a first cavity 24 and a generally cylindrical outer wall 26 substantially surrounding the inner wall 22. The gap defined between the inner wall 22 and outer wall 26 forms a fluid jacket 28 for containing coolant to cool or lower the temperature of the contents of the inner wall 22. A plate fin heat exchanger 30 is disposed in the cavity 24 and is coupled to the inner wall 22 in such a way to be in fluid communication with jacket 28. The outer wall 26 is configured to include a coolant inlet port 32 and a coolant outlet port 34. The flow of coolant through the condensor unit will be controlled by control valve 36 as will be described below. In one embodiment, the coolant inlet and outlet ports 32, 34 will include bypass valves 38, e.g., a 3-way valve, to bypass the coolant around the condensor unit 16 as necessary.

Heat exchanger 30 is disposed in the cavity 24 to divide cavity 24 into a lower cavity 40 and an upper cavity 42. The lower cavity 40 of the condensor unit 16 includes a gas mixture inlet port 44, which is in fluid communication with the fuel converter unit 14. The products of the fuel converter unit 14, including $H_2$, CO, $CO_2$ and a plurality of hydrocarbon species ranging from $CH_4$ to diesel range, in addition to $N_2$ and some $O_2$, flow in gas phase at a temperature of at least 600 degrees Celsius to the condensor unit via gas mixture inlet port 44. The gas mixture inlet port 44 extends into the lower cavity 40 and includes a gas distributor 46 to evenly distribute the gas mixture received from the fuel converter unit 14. The gas mixture inlet port 44 extends into the lower cavity 40 to allow liquid condensate to collect at the bottom of the cavity 40 without flowing back into the inlet port 44. A condensate outlet 48 is configured along the inner wall 22 in the lower cavity 40 and is in fluid communication with the fuel tank 12 to allow liquid condensate collected in the condenser unit to flow to the fuel tank 12. Furthermore, a gas outlet port 50 is configured along on the inner wall in the upper cavity 42 and is in fluid communication with the SCR unit 20. The separated light hydrocarbons will flow through to the gas outlet port 50 to the SCR unit 20.

It is to be appreciated that the heat exchanger 30 is configured to have a large surface area, e.g., a plurality of fins, to come into contact with the entering gas mixture to efficiently perform the separation procedure. By including a coolant jacket 28 in the condenser unit 16, the surface area to come into contact with the gas mixture is increased, i.e., the inner wall 22 aids the heat exchanger in the separation process. Furthermore, the condensor unit 16 may also contain packing material (not shown) to enhance the contact with the gas further. The packing material will be disposed in the lower cavity 40. Packing material may include random packing structures such as raschig rings, typically employed in absorption, distillation and stripping applications, or high performance structured metal packing.

Referring again to FIG. 2, a controller 52 is provided for controlling the overall operations of system 10 and of the condenser unit 16. Although other sensors, transducers, valves, etc. may be employed in the system 10, only the system components associated with the condenser unit will be described. The system 10 includes a first temperature sensor 54 for monitoring the gas outlet temperature coupled to controller 52 via sensing line 56 and a second temperature sensor 58 for monitoring the gas inlet temperature coupled to controller 52 via sensing line 60. Control valve 36 is modulated to control the flow of coolant via command line 62, and bypass valves 38 are positioned via command lines 64, 66. Furthermore, the system 10 includes a liquid level control sensor 68 coupled to controller 52 via sensing line 70 and condensate outlet control valve 72 which is positioned via command line 74.

It is to be appreciated the controller 52 may comprise a micro-controller or a solid-state switch configured to communicate with the sensors 54, 58, 68 and the flow control valves 36, 72. In one embodiment, the controller 52 comprises an analog-to-digital converter accessible through one or more analog input ports. In another embodiment, the controller 52 may include read-out displays, read-only memory (not shown), random access memory (not shown), and a conventional data bus (not shown). As will be recognized by those of ordinary skill in the art, the controller 52 may be embodied in several other ways. In one embodiment, the controller 52 may include a logical processor (not shown), a threshold detection circuitry (not shown) and an alerting system (not shown). Typically, the logical processor is a processing unit that performs computing tasks. It may be a software construct made up using software application programs or operating system resources. In other instances, it may also be simulated by one or more physical processor(s) performing scheduling of processing tasks for more than one single thread of execution thereby simulating more than one physical processing unit.

In operation of the system 10, the products of the fuel conversion process, which include $H_2$, CO, $CO_2$, and a plurality of hydrocarbon species ranging from $CH_4$ to diesel range, in addition to $N_2$ and some $O_2$, flow in gas phase at a temperature of at least 600 degrees Celsius out of the fuel converter unit 14 to the condensor unit 16. This stream is introduced into the condenser unit 16 via the gas mixture inlet port 44. The condenser unit 16 uses a coolant, which can be water or other fluid, that will have its temperature or flow controlled to separate components of the gas mixture entering the condensor unit. It is to be appreciated that coolant in the range of from ambient temperature, e.g., 20° C., up to 80° C. is readily available in conventional locomotives from engine cooling operations, and therefore, no substantive changes to the existing infrastructure are necessary. The coolant circulates in the plate-fin heat exchanger 30 and in the fluid jacket 28 built around the condensor unit to maintain the contents of the condensor unit at a predetermined separation temperature setpoint wherein components of the gas mixture having a dew point above the predetermined setpoint will condense and components having a dew point below the predetermined setpoint will remain in a gas state.

The hydrocarbon separation temperature is marked by monitoring the outlet gas temperature via temperature sensor 54. The desired predetermined setpoint is selected based on the boiling point distribution of the components in the gas mixture. In general, hydrocarbons having a higher number of carbon atoms per molecule ("heavier" hydrocarbons) have a higher dew point than hydrocarbons having a lower number of carbon atoms per molecule ("lighter" hydrocarbons). The setpoint is chosen so as to condense hydrocarbon species heavier than what is desired to be present in the reductant composition, thereby separating these undesired species from the lighter, more desired species. In general, therefore, the setpoint is chosen to be in a range that is less than or equal to the dew point of the lightest hydrocarbon species of all of the hydrocarbon species desired to be condensed from the gas mixture, and greater than the dew point of the heaviest hydrocarbon species of all the hydrocarbon species desired to remain in the vapor state (which are to be used as the reductant). For instance if it is desired to have a gas outlet composition of hydrocarbons $C_{12}$ and below, the setpoint will be a temperature at which only hydrocarbons having a carbon atom per molecule number above $C_{12}$ would condense. The setpoint for this mixture is controlled at gas outlet 50. The predetermined temperature setpoint will depend upon composition of the gas mixture entering inlet 44 and system pressure and can be derived via estimates, after the composition of outlet 50 is known. The controller 52 will adjust the control valve 36 in the coolant outlet so that the temperature of the outlet gas will match the desired separation temperature setpoint. Thus, by selecting the temperature of the outlet gas to specific value, all components in the gas mixture with a dew point on and above that temperature will condense and flow downward inside the condensor unit, thus accumulating at the bottom of the condenser unit in the lower cavity 40 and drained through port 48.

The gas that leaves the top of the condenser unit via outlet port 50 is hydrocarbon-based $NO_x$ reductant having a carbon content in the range desired for use with the SCR unit 20; the gas can be sent directly to the SCR unit 20 from the condenser unit. The liquid condensate is not required for the $NO_x$ SCR unit but is generally still very useful engine fuel. Therefore, the condensate may be recycled back to the engine 18. This recovery and re-use of the hydrocarbon condensate is accounted in the balance calculation for the desired product yield of the fuel converter unit 14, thus increasing its value by 5-7 fold. Yield is defined on the basis of amount of desired products divided by amount of feed to converter unit 14. The amount recycled effectively reduces the perceived amount of feed to converter unit 14, thus increasing the actual yield.

Figure 3:
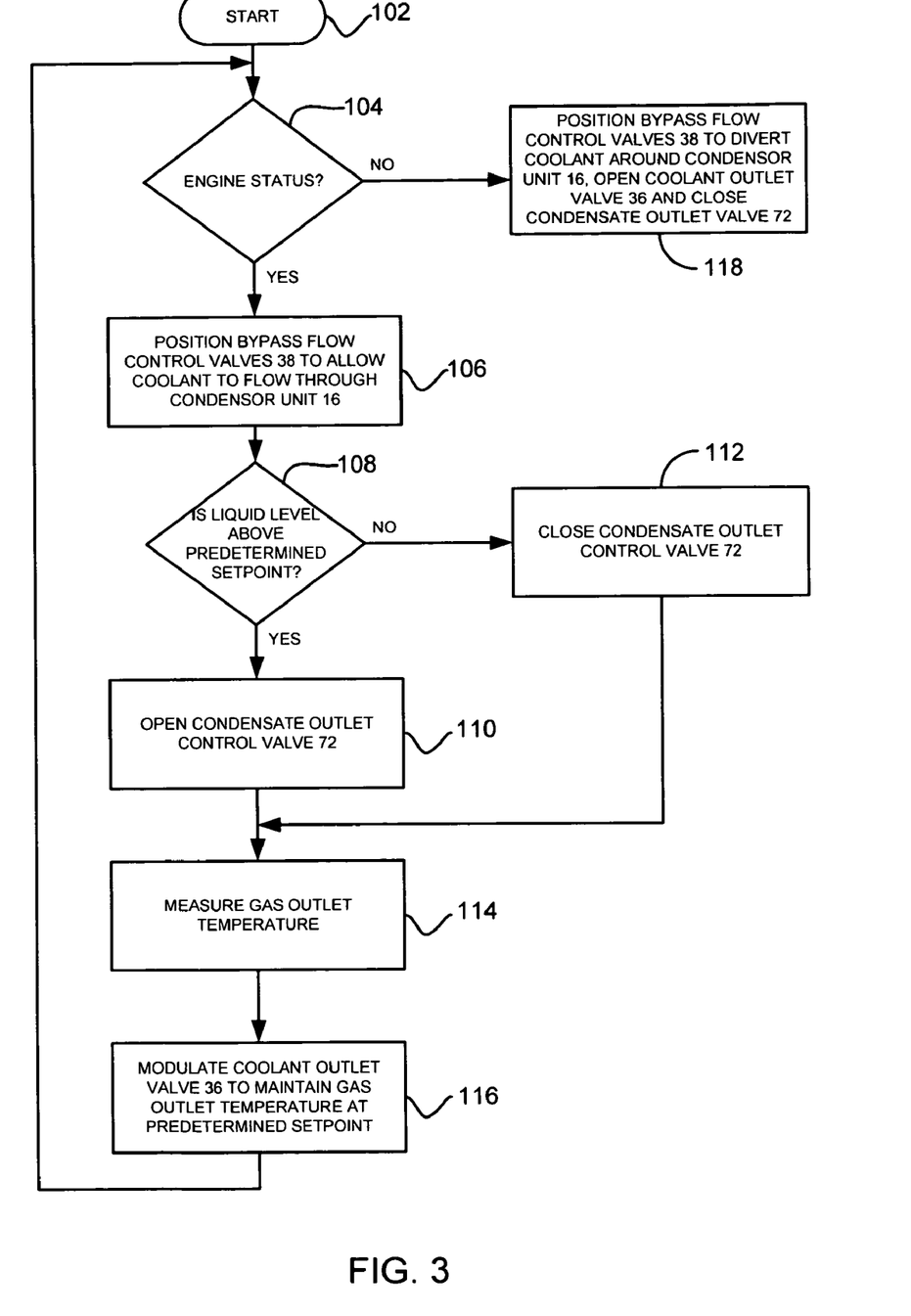
FIG. 3 is an exemplary method flow chart illustrating the separation process of the condensor unit in accordance with aspects of the present disclosure.

FIG. 3 is an exemplary method flow chart illustrating the separation process of the condensor unit in accordance with aspects of the present disclosure. As will be. appreciated by one of ordinary skill in the art, the method may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the present disclosure, but is provided for ease of illustration and description. Although not explicitly illustrated, one of ordinary skill in the art will recognize that one or more of the illustrated steps or functions may be repeatedly performed depending on the particular strategy being used.

Initially at step 102, the system 10 will start up and controller 52 will initialize and perform any necessary start-up routines. In step 104, the controller 52 will determine the status of the engine 18 to determine if the engine is running or not. The status of the engine will be provided by any known conventional means such as a contactor, current switch, etc. If is it determined that the engine 18 is operating, the controller 52 will position the bypass flow control valves 38 to allow the coolant to flow through the condenser unit 16, e.g., flow through the jacket 28 and heat exchanger 30 (step 106).

The gas mixture entering the gas mixture inlet port 44 should not be allowed to escape as a gas through the condensate outlet port 48. Therefore, the controller 52 will monitor the liquid level in the lower cavity via the liquid level control sensor 68 to ensure there is a column of liquid inside cavity 40, thus preventing the gas mixture from escaping. In step 108, the controller 52 will then determine if the liquid level in the lower cavity 40 of the condenser unit is above a predetermined setpoint or level. If it is determined that the liquid level is above the predetermined setpoint, the controller will open condensate outlet control valve 72, in step 110, allowing the condensate to flow to the fuel tank 12 and/or engine 18. Otherwise, the controller 52 will close the condensate outlet control valve 72, in step 112.

In step 114, the controller will measure the gas outlet temperature via temperature sensor 54 and modulate the coolant outlet valve 36 to maintain the gas outlet temperature at the predetermined separation temperature setpoint, in step 116. By controlling the coolant in this manner, the condensor unit 16 and/or heat exchanger 30 will employ a variable heat transfer feature. By maintaining the gas outlet temperature at the predetermined setpoint, components of the gas mixture having a dew point lower than the predetermined setpoint temperature will condense and collect in the lower cavity 40 of the condensor unit 16 while components having a dew point greater than the predetermined separation temperature setpoint will remain in a gas state and exit the condenser unit via the outlet port 50. The liquid condensate will either collect in the cavity 40 or flow to the fuel tank 12 depending on the position of the condensate outlet valve 72. In one embodiment, the process will continuously loop back to step 104 until the controller determines the engine is shut down. In step 118, upon engine shutdown, the controller 52 will position the bypass flow control valves 38 to divert coolant around the condensor unit 16, open coolant outlet valve 36 and close the condensate outlet valve 72.

The light hydrocarbons obtained from the condenser unit 16 are then permitted to flow to the SCR unit 20, where they are used to reduce the $NO_x$ in the engine exhaust stream. The reduction of $NO_x$ occurs over a selective catalytic reduction catalyst. Examples of suitable selective catalytic reduction catalysts are metals such as silver, gallium, cobalt, molybdenum, tungsten, indium, bismuth, vanadium or a combination comprising at least one of the foregoing metals in a binary, ternary or quaternary mixture disposed upon a suitable support. Oxides of metals can be used as catalysts if desired. Oxides of metals can also be used as catalyst supports. Examples of suitable metal oxide supports are alumina, titania, zirconia, ceria, silicon carbide, or a combination comprising at least one of the foregoing materials.

The light hydrocarbons can be used to reduce $NO_x$ in the exhaust stream, according to the following overall reaction (1).

(1)

The exhaust stream usually comprises air, water, CO, $CO_2$, $NO_x$, $SO_x$, $H_2O$ and may also comprise other impurities. Water contained in the exhaust stream is generally in the form of steam. Additionally, uncombusted or incompletely combusted fuel may also be present in the exhaust stream. The light hydrocarbon molecules comprising less than or equal to about 12 carbon atoms along with CO and $H_2$ is fed into the exhaust stream to form a gas mixture, which is then fed through the selective catalytic reduction catalyst. Sufficient oxygen to support the $NO_x$ reduction reaction may already be present in the exhaust stream. If the oxygen present in the exhaust stream is not sufficient for the $NO_x$ reduction reaction, additional oxygen gas may also be introduced into the exhaust stream in the form of air. In some embodiments the gas mixture comprises from about 1 mole percent (mole %) to about 21 mole % of oxygen gas. In some other embodiments the gas mixture comprises from about 1 mole % to about 15 mole % of oxygen gas.

The $NO_x$ reduction reaction may take place over a range of temperatures. In one embodiment, the reduction reaction can occur at a temperature of about 200° C. to about 600° C. In another embodiment, the reduction reaction can occur at a temperature of about 300° C. to about 500° C. In yet another embodiment, the reduction reaction can occur at a temperature of about 350° C. to about 450° C.

Therefore, according to aspects of the present disclosure, by providing a condensor unit at the outlet of the fuel converter, separation of desired $NO_x$ reductant components occurs thereby generating an on-board supply of a desired range of hydrocarbon reductants for the SCR unit. Thus, reductant comprising hydrocarbons comprising a desired range of carbon content is sent to the $NO_x$ SCR system and the condensed part is recycled back to the fuel tank that feeds the engine. This recycling conserves fuel and increases the fuel conversion process efficiency as evidenced by, e.g., an increased product yield 5-7 fold greater than typical diesel cracking processes. The system and method of the present disclosure provides flexibility to select the component range to be separated, by adjusting the separation temperature setpoint, while using a coolant that is readily available, e.g., 80 degree Celsius water which is available in today's locomotive.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method comprising:
   converting in the presence of a catalyst composition, a heavy hydrocarbon molecule having 13 or more carbon atoms per molecule into a light hydrocarbon molecule having 12 or less carbon atoms per molecule; wherein the catalyst composition comprises sites that perform a cracking function and sites that perform a catalytic partial oxidation function, wherein the cracking function enables the conversion of the heavy hydrocarbon molecules to light hydrocarbon molecules, and wherein the catalytic partial oxidation function enables oxidation of a hydrocarbon based fossil fuel and coke that is deposited on the catalyst composition;
   separating the light hydrocarbon molecules from heavy hydrocarbon molecules by condensing the heavy hydrocarbons into a condensate;
   reacting the light hydrocarbon molecules with an exhaust stream of an engine in the presence of a selective catalytic reduction catalyst; and
   reducing $NO_x$ content in the exhaust stream.

2. The method as in claim 1, wherein the converting of the heavy hydrocarbon molecules to the light hydrocarbon molecules occurs in the presence of a secondary gas comprising hot gases from the exhaust stream of the engine.

3. The method as in claim 1, further comprising feeding the light hydrocarbon molecules to the selective catalytic reduction catalyst.

4. The method as in claim 1, further comprising feeding the heavy hydrocarbon molecules to the engine or a fuel tank.

5. The method as in claim 4, wherein the separating step occurs in a condensor unit maintained at a predetermined separation temperature setpoint.

6. The method as in claim 5, wherein the predetermined temperature setpoint is chosen from a range that is less than or equal to the dew point of the lightest hydrocarbon species of all of the hydrocarbon species desired to be condensed from the gas, and greater than the dew point of the heaviest hydrocarbon species of all the hydrocarbon species desired to remain in a vapor state.

7. The method as in claim 6, wherein the predetermined temperature setpoint is the dew point of the lightest hydrocarbon species to be separated and condensed from the gas mixture entering the condensor unit.

8. A locomotive employing the method of claim 1 on-board.

9. A system for reducing NOx emissions comprising:
   a fuel tank in fluid communication with a fuel converter, wherein the fuel converter is located down stream of the fuel tank and wherein the fuel converter comprises a catalyst composition that is operative to continuously convert heavy hydrocarbons having 13 or more carbon atoms per molecule into light hydrocarbons having 12 or less carbon atoms per molecule to form a gas mixture;
   a condensor unit located downstream of the fuel converter and upstream of a selective catalytic reduction unit;
   the selective catalytic reduction unit in fluid communication with the condensor unit and located downstream of the condensor unit; and
   an engine in fluid communication with the fuel tank and the selective catalytic reduction unit, wherein the engine is located downstream of the fuel tank and upstream of the selective catalytic reduction unit;
   wherein the condensor unit comprises a generally cylindrical inner wall defining a cavity having a first lower end and a second upper end, the first lower end is configured to include a gas inlet for receiving the gas mixture from the fuel converter and the second upper end is configured to include the gas outlet in fluid communication with the selective catalytic reduction unit, and a heat exchanger disposed within the cavity along the cylindrical wall dividing the cavity into a lower cavity and an upper cavity, wherein the heat exchanger is configured to contact the gas mixture entering the gas inlet, to allow light hydrocarbons to flow to the selective catalytic reduction unit via the gas outlet, to condense the heavy hydrocarbons to a condensate and collect the condensate in the lower cavity.

10. The system as in claim 9, further comprising an outer wall substantially surrounding the inner wall and forming a gap therebetween, the gap being in fluid communication with the heat exchanger.

11. The system as in claim 10, wherein a coolant is circulated through the heat exchanger and the gap.

12. The system as in claim 11, further comprising a temperature controller configured to maintain a predetermined temperature setpoint of the gas flowing out of the gas outlet by modulating the flow of coolant.

13. The system as in claim 12, wherein the gas mixture comprises a plurality of hydrocarbon species and wherein the predetermined temperature setpoint is chosen from a range that is less than or equal to the dew point of the lightest hydrocarbon species of all of the hydrocarbon species desired to be condensed from the gas, and greater than the dew point of the heaviest hydrocarbon species of all the hydrocarbon species desired to remain in a vapor state.

14. The system as in claim 13, wherein the predetermined temperature setpoint is the dew point of the lightest hydrocarbon species to be separated from the gas mixture entering the condensor unit.

15. The system as in claim 13, wherein the first lower end of the inner wall includes a condensate outlet port for draining the condensate of heavy hydrocarbons from the lower cavity and feeding the condensate to the engine.

16. The system as in claim 15, further comprising a liquid level control apparatus, wherein a minimum level of condensate is maintained in the lower cavity to prevent the gas mixture entering the gas inlet from escaping through the condensate outlet port.

17. The system as in claim 9, wherein exhaust gas from the engine is fed to the selective catalytic reduction unit where the light hydrocarbons react with the exhaust gas to reduce $NO_x$ content in the exhaust gas.

18. The system as in claim 9, wherein the catalyst composition comprises sites that perform a cracking function and sites that perform a catalytic partial oxidation function, wherein the cracking function enables the conversion of the heavy hydrocarbon molecules to light hydrocarbon molecules, and wherein the catalytic partial oxidation function enables oxidation of a hydrocarbon-based fossil fuel and coke that is deposited on the catalyst composition.

19. The system as in claim 9, wherein the fuel tank comprises diesel, kerosene, bio-diesel, gasoline, jet fuel, logistic fuel and fuel oil.

20. A vehicle or stationary generator employing the system of claim 9.

21. A locomotive employing the system of claim 9 onboard.

22. A condensor unit comprising:
a generally cylindrical inner wall defining a cavity having a first lower end and a second upper end, the first lower end is configured to include a gas inlet and the second upper end is configured to include a gas outlet;
a heat exchanger disposed within the cavity along the cylindrical wall dividing the cavity into a lower cavity and an upper cavity, wherein the heat exchanger is configured to contact a gas entering the gas inlet, to allow a gaseous species to exit via the gas outlet, to condense a condensate from the gas, and to collect the condensate in the lower cavity;
an outer wall substantially surrounding the inner wall and forming a gap therebetween, the gap being in fluid communication with the heat exchanger, wherein a coolant is circulated through the heat exchanger and the gap; and
a temperature controller configured to maintain a predetermined temperature setpoint of the gaseous species flowing out of the gas outlet by modulating the flow of the coolant.

23. The condensor unit as in claim 22, wherein the gaseous species comprises light hydrocarbons and the condensate comprises heavy hydrocarbons.

24. The condensor unit as in claim 22, wherein the gas comprises a plurality of hydrocarbon species, and wherein the predetermined temperature setpoint is chosen from a range that is less than or equal to the dew point of the lightest hydrocarbon species of all of the hydrocarbon species desired to be condensed from the gas, and greater than the dew point of the heaviest hydrocarbon species of all the hydrocarbon species desired to remain in a vapor state.

25. The condensor unit as in claim 24, wherein the predetermined temperature setpoint is the dew point of the lightest hydrocarbon species to be separated and condensed from the gas entering the condensor unit.

26. The condensor unit as in claim 24, wherein the first lower end of the inner wall includes a condensate outlet port for draining the condensate from the lower cavity.

27. The condensor unit as in claim 26, further comprising a liquid level control apparatus, wherein a minimum level of condensate is maintained in the lower cavity to prevent the gas entering the gas inlet from escaping through the condensate outlet port.

* * * * *